United States Patent Office 3,014,823
Patented Dec. 26, 1961

3,014,823
PRODUCTION OF HOLLOW TURBINE BLADES
Ralph Edward Buttress, Barclay Keegan, and George Robert Stuart, Glasgow, Scotland, assignors to The International Nickel Company, Inc., New York, N.Y., a corporation of Delaware
No Drawing. Filed Aug. 27, 1957, Ser. No. 681,871
Claims priority, application Great Britain Aug. 29, 1956
3 Claims. (Cl. 148—11.5)

The present invention relates to the production of hollow bodies and, more particularly, to the production of hollow bodies made from hot-workable heat-resistant metals.

Heretofore, the art has endeavored to produce hollow articles, particularly hollow turbine blades containing one or more cooling passages, from hot-workable heat-resistant metals such as nickel-chromium alloys, including nickel-chromium-cobalt alloys. Such articles may be made by making holes in a billet or the like of heat resistant alloy; filling these holes with a filler material having properties of flow similar to those of the alloy; extruding or otherwise hot working the billet or the like so as to change the shape of both the alloy and the filler, usually by elongating the filler and finally, removing the filler. This process is of particular value in the production of turbine blades having internal passageways for air for the cooling of the blades.

The filler used may be metal and, in particular, it may advantageously be an alloy of iron, manganese and titanium as described and claimed in U.S. application Serial No. 509,380, now Patent No. 2,891,307, issued June 23, 1959. This alloy should contain about 5% to about 20% manganese, about 1% to about 10% titanium, the balance being essentially iron, and be of low carbon content, i.e., contain less than 0.1% carbon, in order to be completely satisfactory. When the aforementioned process is used with the aforementioned low carbon filler material to produce hollow turbine blades from hot-workable heat-resistant nickel-chromium alloys, microscopic examination of the formed alloy, after the filler has been removed, shows that the grain structure is enlarged in the zone which was adjacent the filler. It will be readily appreciated that a local change in grain structure surrounding each passageway within the alloy is inimical to the satisfactory functioning of the finished turbine blade, in that fatigue from thermal stresses is most liable to begin in these transition zones.

Although attempts were made to overcome the foregoing difficulties and other disadvantages, none, as far as we are aware, was entirely successful when carried into practice commercially on an industrial scale.

It has now been discovered that by the use of a special process step, the difficulties encountered with regard to change in local grain size when hot working filled heat-resistant metals may be substantially minimized.

It is an object of the present invention to provide an improved process for the production of heat-resistant metal objects which substantially minimizes the difficulties arising with regard to change in local grain size in heat-resistant metal adjacent filled passages.

Another object of the invention is to provide an improved process for the production of hollow turbine blades made from heat-resistant metal which substantially minimizes the difficulties arising with regard to local grain growth in heat-resistant metal adjacent filled passages.

Other objects and advantages will become apparent from the following description.

Generally speaking, the present invention contemplates an improved process for the production of hollow objects from nickel-chromium heat-resistant metal, whereby undesirable grain growth of the heat-resistant metal in the region of the filler material is minimized and thus, a substantially uniform grain size is produced throughout the mass of metal. This process comprises providing a surface coating of carbon on the filler material prior to hot working the composite nickel-chromium heat-resistant metal filler material blank. The use of carbon in this respect is most advantageous particularly when the nickel-chromium heat-resistant metal contains about 10% to about 21% chromium, up to 22% cobalt, up to about 5.5% molybdenum, from about 1% to about 3% titanium, from about 0.5% to about 6% aluminum, less than 0.1% carbon with the balance essentially nickel and incidental impurities normally associated therewith.

In carrying the invention into practice, advantageous results have been obtained by coating the walls of the holes in the billet or the like which receive the filler with carbonaceous material, or the filler may itself be so coated, or the filler may be subjected to a carburizing treatment such as is used in carburizing iron.

Coating of the holes is convenient if they are blind holes made by drilling a billet or the like. Such a hole may be partly filled with graphite in a fluid vehicle (tallow or oil). The insertion of a rod of the filler then causes the graphite to be squeezed into the fine clearance space between the filler and the passage wall. This clearance space is commonly only about 0.005 inch wide, the filler making a push fit in the hole. If the filler, usually in the form of rod, is itself coated, any ordinary carburizing paste or colloidal graphite may be used.

An iron-manganese-titanium alloy filler may be carburized by being packed in a heat-resisting box filled with any carburizing compound and heated out of contact with air at a temperature above about 800° C., for example, about 950° C. The depth of the carburization in the filler may vary from about 0.002 inch upwards to about 0.01 inch and should increase with the cross-sectional dimensions of the filler. If the filler is a rod of $\frac{3}{16}$ inch diameter, the preferred depth of carburization is 0.005 inch.

The fillers used in processes of the kind in question are not always homogeneous. The iron-manganese-titanium filler material which is readily attacked by acid may have within it an asymmetrically placed fine core of a metal or alloy not readily attacked by acid. The present invention may be used to avantage with these non-homogeneous fillers.

For the purpose of giving those skilled in the art a better understanding of the invention and/or a better appreciation of the advantages of the invention, the following illustrative examples are given:

*Example 1*

Two billets of nickel-chromium-cobalt alloy sold under the trademark "Nimonic 90" and containing approximately 58% nickel, 16% cobalt, 20% chromium and small amounts of titanium, aluminum, manganese, silicon, iron and about 0.08% carbon were drilled with four holes each. The billets were filled with filler material made from an alloy containing 10% manganese, 2% titanium with the balance iron. One of the billets was filled with untreated filler material and the other was filled with graphitized filler (i.e., graphite and tallow mixture was put into the holes prior to filling). The billets were extruded at 1180° C. The resulting extruded bars were cold straightened and were given a heat treatment comprising heating for eight hours at 1070° C. then air-cooling, then heating for sixteen hours at 700° C. and thereafter air-cooling. The general grain size of the bars was 4.5 as measured on the ASTM micro grain size scale as designated in ASTM designation E91–51T. The metal around the holes had a grain size of about 4.0 measured on the same scale when the filler was untreated. On the other hand, when using the graphitized filler of the present invention, the grain size in the hole area was 4.5.

*Example II*

Two billets of nickel-chromium-cobalt alloy similar to the nickel-chromium-cobalt alloy used in Example I were drilled with 15 holes each. Both of these billets were filled with the same filler alloy used in Example I. In one instance the filler was untreated. In the other instance, the filler material was carburized in a cyanide bath to a depth of about 0.01 inch. Both billets were extruded at a temperature of 1185° C. The resulting bars were cold straightened and heat treated for eight hours at 1070° C. then air cooled and then heated for sixteen hours at 700° C. and then air cooled. The average grain size of the bars was 5.0 as measured on the aforementioned ASTM micro grain size scale. The grain size of the hole area where the untreated filler was used was 4.5 on said scale but where the carburized filler was used the grain size of the hole area was 5.0.

The present invention is particularly applicable to the production of hollow turbine blades containing cooling passages by hot-working nickel-chromium heat-resistant metal in cooperation with iron-manganese-titanium alloy fillers.

During the hot-working there is a constitutional change in the nickel-chromium heat-resistant metal and the iron-manganese-titanium filler caused by diffusion. One constituent so affected is the carbon of the nickel-chromium heat-resistant metal and any transfer of this to the filler sets up an area in the nickel-chromium heat-resistant metal which is deficient in carbon with an attendant change of the grain size in that area. It is to be appreciated that this phenomenon is not restricted to the carbon alone, but is also true for the diffusion of manganese and titanium from the filler to the nickel-chromium heat-resisting metal and vice versa, which again are liable to disturb the composition of the nickel-chromium heat-resistant metal and thereby cause a change in the grain size. Regardless of mechanism, however, it is to be observed that providing a coating of carbon on the iron-manganese-titanium filler material effectively minimizes the undesirable tendency toward grain growth in the nickel-chromium alloy blank.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for decreasing localized grain growth adjacent holes in hollow nickel-chromium alloy articles which occurs during the production of said articles by hot working hollow heat resistant nickel-chromium alloy billets containing about 10% to 21% chromium, up to about 22% cobalt, up to about 5.5% molybdenum, from about 1% to about 3% titanium, from about 0.5% to about 6% aluminum, less than about 0.1% carbon with the balance essentially nickel and having holes therein filled with an iron-manganese-titanium alloy filler containing about 5% to about 20% manganese, about 1% to about 10% titanium, and the balance being essentially iron, which comprises providing said iron-manganese-titanium filler with a coating of carbon prior to hot working and thereafter hot working said nickel-chromium alloy billet having the holes filled with said carbon coated iron-manganese-titanium alloy filler.

2. A process for decreasing localized grain growth adjacent holes in hollow nickel-chromium alloy articles which occurs during the production of said articles by hot working hollow heat resistant nickel-chromium alloy billets containing about 10% to 21% chromium, up to about 22% cobalt, up to about 5.5% molybdenum, from about 1% to about 3% titanium, from about 0.5% to about 6% aluminum, less than about 0.1% carbon with the balance essentially nickel and having holes therein filled with an iron-manganese-titanium alloy filler containing about 5% to about 20% manganese, about 1% to about 10% titanium and the balance being essentially iron, which comprises providing said iron-manganese-titanium filler with a carburized surface prior to hot working and thereafter hot working said nickel-chromium alloy billet having the holes filled with said carburized iron-manganese-titanium alloy filler.

3. A process for decreasing localized grain growth adjacent holes in hollow nickel-chromium alloy articles which occurs during the production of said articles by hot working hollow heat resistant nickel-chromium alloy billets containing about 10% to 21% chromium, up to about 22% cobalt, up to about 5.5% molybdenum, from about 1% to about 3% titanium, from about 0.5% to about 6% aluminum, less than about 0.1% carbon with the balance essentially nickel and having holes therein filled with an iron-manganese-titanium alloy filler containing about 5% to about 20% manganese, about 1% to about 10% titanium and the balance being essentially iron, which comprises providing said iron-manganese-titanium filler with a coating of graphite in tallow prior to hot working and thereafter hot working said nickel-chromium alloy billet having the holes filled with said coated iron-manganese-titanium alloy filler.

References Cited in the file of this patent
UNITED STATES PATENTS 2,528,216   Dunn _____ Oct. 31, 1950